(12) United States Patent
Fujita (10) Patent No.: US 10,763,026 B2
(45) Date of Patent: Sep. 1, 2020

(54) DEVICE

(71) Applicant: FUJI ELECTRIC CO., LTD., Kanagawa (JP)

(72) Inventor: Satoru Fujita, Tachikawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 215 days.

(21) Appl. No.: 15/792,766

(22) Filed: Oct. 25, 2017

(65) Prior Publication Data

US 2018/0182527 A1 Jun. 28, 2018

(30) Foreign Application Priority Data

Dec. 28, 2016 (JP) .................. 2016-257136

(51) Int. Cl.
| | |
|---|---|
| *H01F 27/28* | (2006.01) |
| *H01F 27/08* | (2006.01) |
| *H02M 3/156* | (2006.01) |
| *H01F 17/04* | (2006.01) |
| *H01F 27/00* | (2006.01) |
| *H01F 27/29* | (2006.01) |
| *H01F 27/02* | (2006.01) |
| *H02M 3/28* | (2006.01) |
| *H01F 27/40* | (2006.01) |
| *H01F 30/00* | (2006.01) |
| *H02M 1/32* | (2007.01) |

(52) U.S. Cl.
CPC ......... *H01F 27/085* (2013.01); *H01F 17/045* (2013.01); *H01F 27/006* (2013.01); *H01F 27/025* (2013.01); *H01F 27/2804* (2013.01); *H01F 27/2823* (2013.01); *H01F 27/2876* (2013.01); *H01F 27/29* (2013.01); *H01F 27/40* (2013.01); *H02M 3/156* (2013.01); *H02M 3/285* (2013.01); *H01F 27/402* (2013.01); *H01F 30/00* (2013.01); *H01F 2027/2819* (2013.01); *H02M 2001/327* (2013.01)

(58) Field of Classification Search
CPC .... H01F 27/085; H01F 17/045; H01F 27/006; H01F 27/29; H01F 27/2876; H01F 27/025; H01F 27/2823
USPC ....... 336/178, 179, 185, 196, 198, 200, 208, 336/212, 213, 221, 232
See application file for complete search history.

(56) References Cited

U.S. PATENT DOCUMENTS

| | | | | |
|---|---|---|---|---|
| 2004/0012381 | A1* | 1/2004 | Hachisuka | G01R 15/18 324/117 R |
| 2004/0032313 | A1* | 2/2004 | Ferencz | H01F 27/266 336/200 |
| 2007/0152795 | A1* | 7/2007 | Zeng | H01F 27/2804 336/212 |

(Continued)

FOREIGN PATENT DOCUMENTS

| | | |
|---|---|---|
| JP | 2006-013094 A | 1/2006 |
| JP | 2006013094 A * | 1/2006 |

(Continued)

*Primary Examiner* — Tszfung J Chan (57) ABSTRACT

There is provided a device that includes a core, a first winding portion that turns around an outer circumference of the core, a plurality of sub-substrates each having a pattern of a second winding turning around the outer circumference of the core, and a main substrate on which a plurality of sub-substrates are mounted.

15 Claims, 9 Drawing Sheets

(56) References Cited

U.S. PATENT DOCUMENTS

| | | | | |
|---|---|---|---|---|
| 2009/0085702 | A1* | 4/2009 | Zeng | H01F 27/292 336/107 |
| 2011/0032683 | A1* | 2/2011 | Li | H05K 7/1432 361/760 |
| 2013/0188329 | A1* | 7/2013 | Chang | H05K 1/18 361/836 |
| 2015/0061805 | A1* | 3/2015 | Eom | H01F 27/2804 336/65 |
| 2015/0093924 | A1* | 4/2015 | Villarreal | B29C 65/081 439/95 |
| 2015/0326141 | A1* | 11/2015 | Takahashi | H01F 30/00 363/126 |
| 2015/0332838 | A1* | 11/2015 | Blanke | H01F 27/2804 336/170 |
| 2016/0035478 | A1* | 2/2016 | Furui | H01F 27/2804 336/192 |
| 2016/0293324 | A1* | 10/2016 | Hsiao | H01F 27/325 |
| 2018/0040415 | A1* | 2/2018 | Katagiri | H01F 30/10 |

FOREIGN PATENT DOCUMENTS

| | | | |
|---|---|---|---|
| JP | 2008-178208 A | | 7/2008 |
| JP | 2010213478 A | * | 9/2010 |

* cited by examiner

FIG.6B ns of the features described in the embodiment(s) are not necessarily essential to means provided by aspects of the invention.

DEVICE

The contents of the following Japanese patent application are incorporated herein by reference:
NO. 2016-257136 filed in JP on Dec. 28, 2016.

BACKGROUND

1. Technical Field

The present invention relates to devices.

2. Related Art

Conventionally, in devices including a transformer, a winding formed of copper wire, a copper sheet, or the like is connected to a circuit substrate by soldering (for example, see Patent Documents 1 and 2).

Patent Document 1: Japanese Patent Application Publication No. 2006-013094
Patent Document 2: Japanese Patent Application Publication No. 2008-178208

However, connection by soldering undesirably generates heat in the connected portion due to contact resistance.

SUMMARY

An object of the technological innovation included herein is to provide devices that can solve the above problem. The above and other objects can be achieved by combinations described in the claims. That is, a first aspect of the present invention provides a device including a core, a first winding portion that turns around the outer circumference of the core, a plurality of sub-substrates each having a pattern of a second winding turning around the outer circumference of the core, and a main substrate on which the plurality of sub-substrates are mounted.

The summary clause does not necessarily describe all necessary features of the embodiments of the present invention. The present invention may also be a sub-combination of the features described above.

DESCRIPTION OF EXEMPLARY EMBODIMENTS

Figure 1:
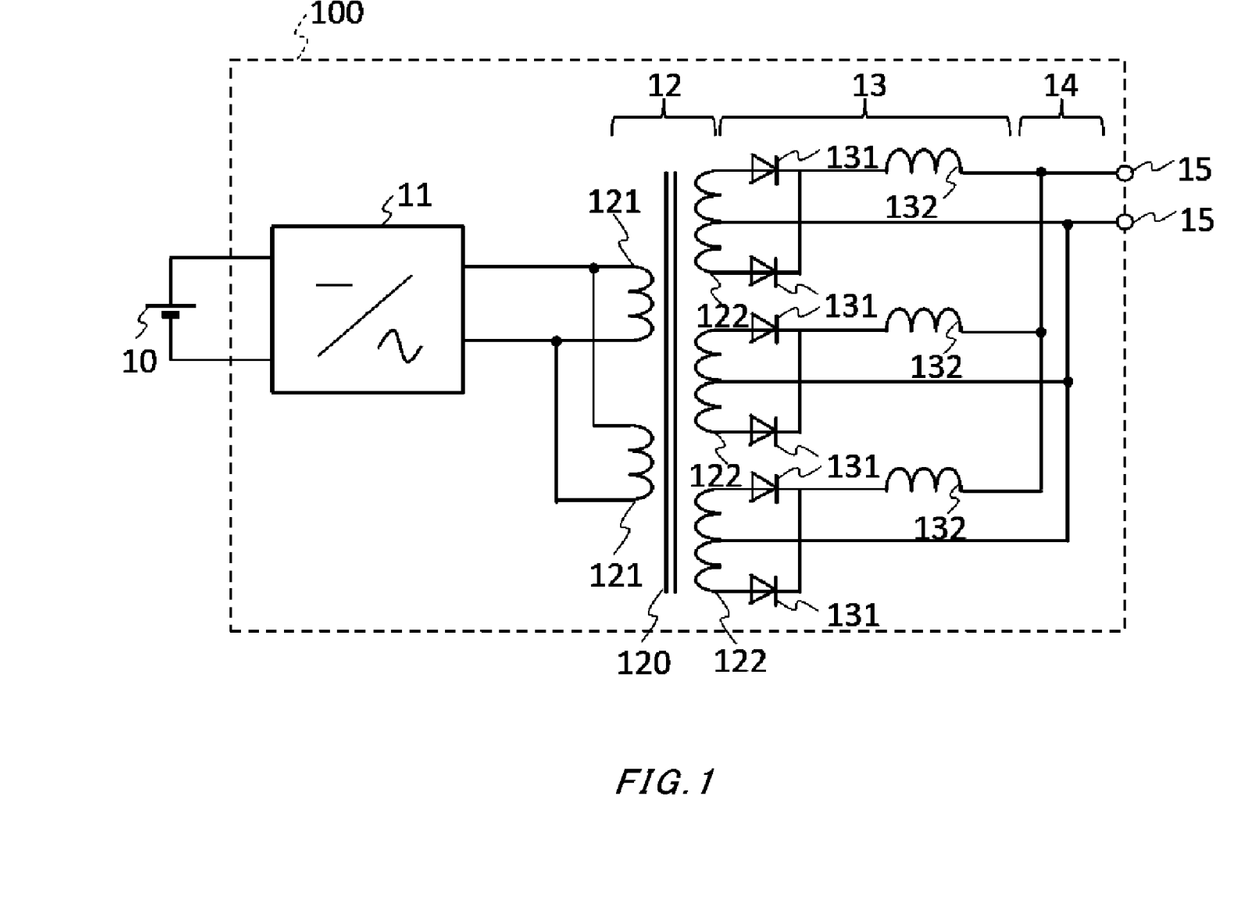
FIG. 1 shows a device according to the present embodiment.

Hereinafter, (some) embodiment(s) of the present invention will be described. The embodiment(s) do(es) not limit the invention according to the claims. Also, all the combi- FIG. 1 shows a circuit structure of a device 100 according to the present embodiment. In the present embodiment, as an example, the device 100 is a DC/DC converter and converts DC power such as 400 V or 800 V into DC power such as 10 V or 50 V, for example. Note that the device 100 may perform the opposite conversion. The device 100 may include an inverter 11, a transformer 12, one or more (three as an example in the present embodiment) rectifying circuits 13, a collecting portion 14, and an output terminal 15.

The inverter 11 converts an input current supplied from a DC power source 10 into AC and supplies it to the transformer 12. In the present embodiment, as an example, the inverter 11 includes a wide gap semiconductor. The wide gap semiconductor is a semiconductor that has a greater band gap than a silicon semiconductor and is a semiconductor such as a SiC, GaN, diamond (C), AlN, AlGaN, or ZnO semiconductor, for example. By using the wide gap semiconductor, the inverter 11 is able to output AC power within a range of 100 kHz through 1 MHz. Note that the DC power source 10 may be installed in the device 100.

The transformer 12 transforms voltage of AC power supplied from the inverter 11 and insulates input and output of the device 100. The transformer 12 may supply the transformed AC to the rectifying circuit 13. The transformer 12 has a core 120, one or more (two as an example in the present embodiment) windings 121, a plurality of (three as an example in the present embodiment) windings 122.

The core 120 may be shared by pairs of the windings 121 and the windings 122. Here in the present embodiment, the inverter 11 includes the wide gap semiconductor and can output a high frequency AC. Therefore, by the amount of reduction in magnetic flux (=voltage×time) in the transformer 12, a cross-sectional area of the core 120 can be made smaller and the transformer 12 can be downsized and lightened.

The two windings 121 are primary windings and an exemplary first winding portion. The numbers of turns of the two windings 121 may be equal to each other. The two windings 121 may be connected in parallel to the inverter 11.

The three windings 122 are secondary windings and an exemplary second winding. The numbers of turns of the three windings 122 may be equal to each other and may be fewer than the number of turns of the windings 121. The three windings 122 may be connected in series to the rectifying circuits 13 and supply the transformed AC to the rectifying circuits 13, respectively.

The three rectifying circuits 13 are connected to the secondary sides of the transformers 12, respectively, and rectify AC from the windings 122. The rectifying circuits 13 may supply DC obtained by the rectification to the collecting portion 14. The rectifying circuits 13 may each include a rectifying element 131 that rectifies AC from the winding 122 and an inductor 132 connected between the rectifying element 131 and the output terminal 15. In the present embodiment, as an example, the rectifying circuits 13 are center-tapped full wave rectifying circuits and each have two rectifying elements 131 and one inductor 132.

The two rectifying elements 131 may be two diodes the anodes of which are connected to both ends of the winding 122 of the transformer 12 and the cathodes of which are connected in parallel to the same inductor 132.

The inductor 132 may serve as a choke coil. Here in the present embodiment, the inverter 11 includes the wide gap semiconductor and can output a high frequency AC. Therefore, by the amount of reduction in magnetic flux (=voltage× time) in the inductor 132, a cross-sectional area of the inductor 132 can be made smaller and the inductor 132 can be downsized and lightened. Note that the rectifying circuit 13 may not have the inductor 132.

The collecting portion 14 collects DC output from each of the three rectifying circuits 13. The collecting portion 14 may supply the collected DC to the output terminal 15. The output terminal 15 outputs the DC output from the collecting portion 14, to the outside of the device 100.

Figure 2A:
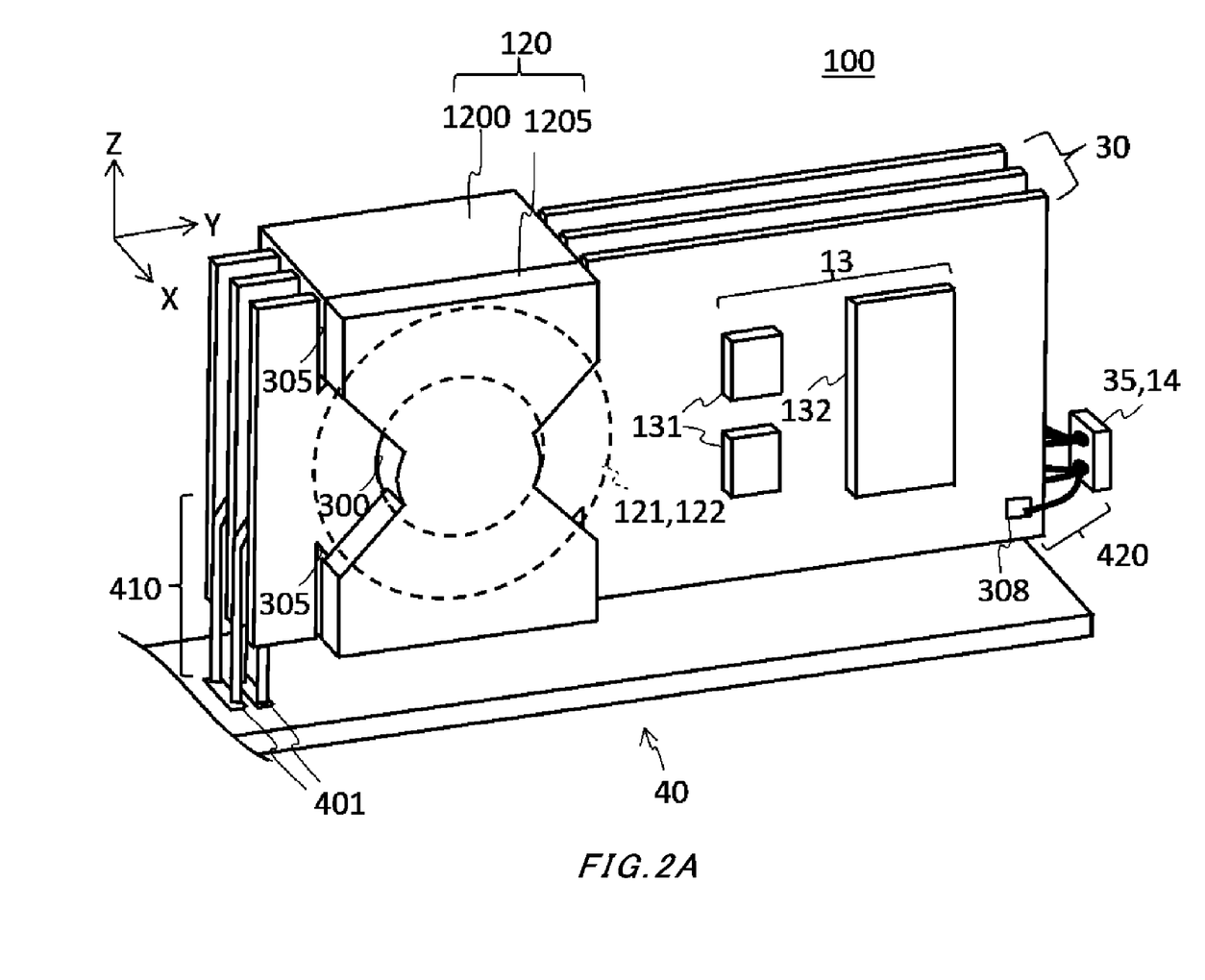
FIG. 2A shows a structure of the device according to the present embodiment.
Figure 2B:
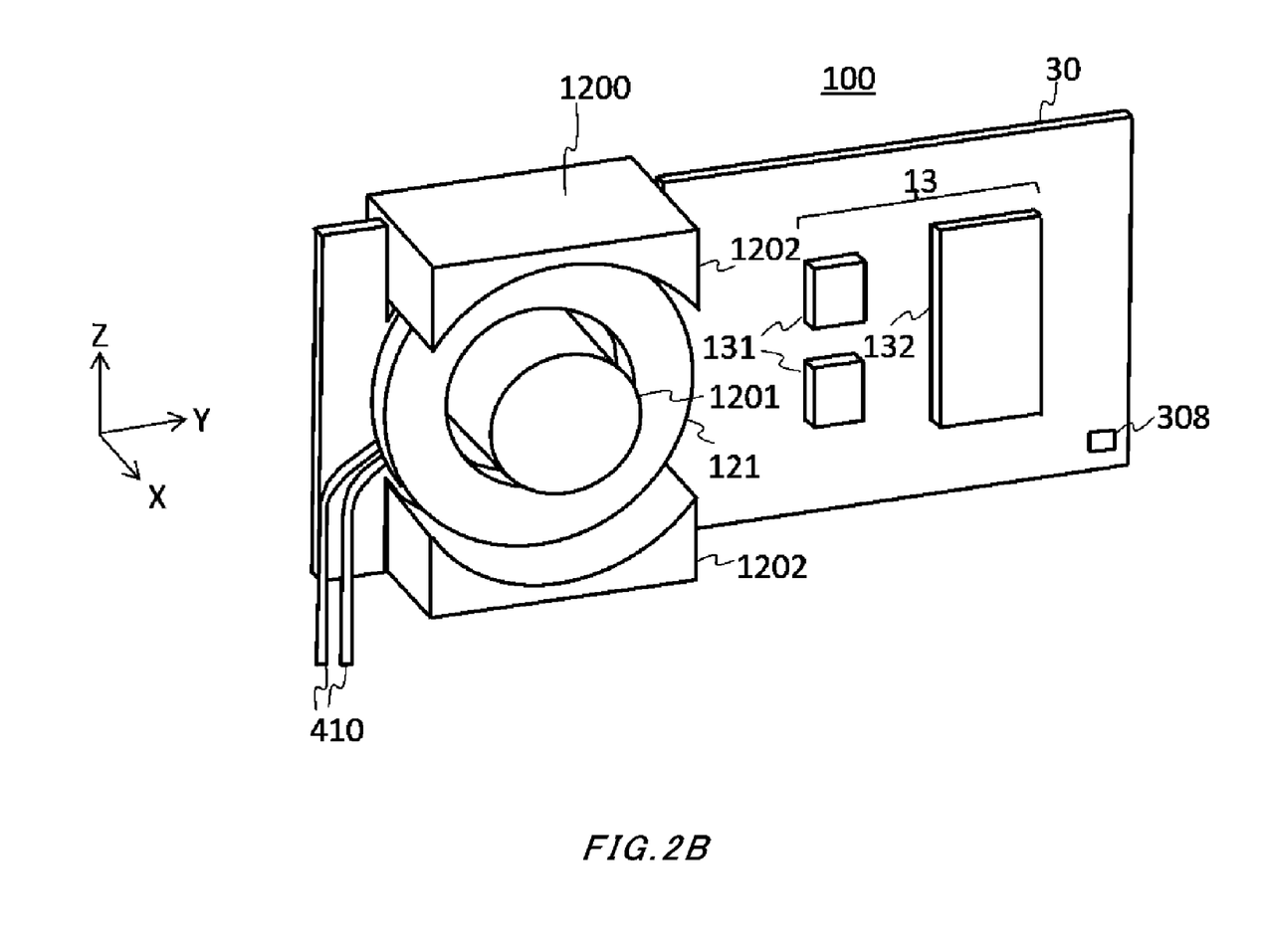
FIG. 2B shows a structure of the device according to the present embodiment.

FIG. 2A and FIG. 2B each show a structure of the device 100 according to the present embodiment. Here, XYZ directions in the drawings are directions orthogonal to each other, and in the present embodiment, as an example, the Z direction is the vertical direction. Also, FIG. 2B illustrates only part of the structure in FIG. 2A (a sub-substrate 30, the winding 121, and a first core 1200, which are illustrated on the back side in FIG. 2A and will be described later).

The device 100 includes, in addition to the above-described core 120 and the two windings 121, a plurality of (three in the present embodiment as an example) sub-substrates 30, a connector 35, and a main substrate 40.

The core 120 is provided to penetrate each sub-substrate 30. For example, the core 120 may have the E-shaped first core 1200 and an I-shaped second core 1205 as seen from the Y direction. The first core 1200 faces the second core 1205 along the X direction and may have a core body 1201 that is a central leg portion of three leg portions protruding toward the second core 1205, and yoke portions 1202, which are the leg portions on both sides. Among them, at least the core body 1201 may penetrate the sub-substrate 30. Note that in the present embodiment, as described above, the inverter 11 includes the wide gap semiconductor and can output a high frequency AC, so that the transformer 12 may be downsized and lightened.

The two windings 121 each turn around the outer circumference of the core body 1201. In the present embodiment, as an example, the windings 121 each turn around the outer circumference of the core body 1201 between the two yoke portions 1202. The two windings 121 may be formed by winding a wire-type conductor such as a metal wire. Also, in the present embodiment, as an example, each winding 121 is arranged between different sub-substrates 30. However, the winding 121 may be arranged on one or both of the front side and the back side of a plurality of sub-substrates 30.

The three sub-substrates 30 are mounted on the main substrate 40. For example, the three sub-substrates 30 may be mounted in parallel to each other on the main substrate 40. In the present embodiment, as an example, the three sub-substrates 30 are arranged to be perpendicular to the X direction. Note that although illustration is omitted in the drawing, each sub-substrate 30 may have one or more fixing pins on an edge thereof, the fixing pins protruding toward the main substrate 40. Each sub-substrate 30 may be fixed to the main substrate 40 with the one or more fixing pins respectively being inserted into one or more fixing holes provided in the main substrate 40. The fixing pins and the fixing holes may be soldered, being inserted into each other. As an example, the sub-substrate 30 may have a pin header on an edge thereof for the fixation and be fixed to the main substrate 40, with the pin header being fit into a pin socket provided in the main substrate 40.

Each sub-substrate 30 may be a rectangular printed circuit board. For example, the sub-substrate 30 may have a greater strength than a copper sheet to constitute the winding. This allows the sub-substrate 30 to be firmly installed to stand on the main substrate 40.

A pattern of winding 122 that turns around the outer circumference of the core body 1201 is formed on each of the three sub-substrates 30. For example, each of the three sub-substrates 30 may have a through hole 300 into which a magnetic core portion (the core body 1201 as an example in the present embodiment) of the core 120 is inserted. Also, the pattern of the winding 122 on each of the three sub-substrates 30 may turn around the through hole 300. In this way, each winding 122 faces one or more windings 121, the winding 122 turning around the outer circumference of the core body 1201. The through hole 300 and the pattern of the winding 122 may be provided on one of the narrow sides (on the left in the drawing) of the sub-substrate 30.

Also, each of the three sub-substrates 30 may have a notch 305 on at least one side thereof. Through the notch 305, the yoke portion 1202 is inserted on the side of the outer circumference of the winding 122 in the core 120. In the present embodiment, as an example, each sub-substrate 30 has the notch 305 on the top and bottom sides thereof.

Also, the three sub-substrates 30 may each have the above-described rectifying circuit 13 that rectifies AC from the winding 122 mounted on the substrate and two output terminals 308 for outputting DC that has been rectified by the rectifying circuit 13. In the present embodiment, as an example, the rectifying circuit 13 may be provided on the other narrow side (on the right side of the drawing) of the sub-substrate 30. Also, the rectifying circuit 13 may be provided on the front surface of the sub-substrate 30 (on the front side of the drawing). The two output terminals 308 may be provided on the front surface and the back surface of the sub-substrate 30, respectively, and may be connected to the connector 35 with electric wires 420, respectively. Here in the present embodiment, as described above, the inverter 11 includes the wide gap semiconductor and can output a high frequency AC, so that the inductor 132 may be downsized and lightened.

Note that in the sub-substrate 30, a conduction pattern in a portion where DC flows may be longer than a conduction pattern in a portion where AC flows. For example, in the sub-substrate 30, a conduction pattern of the rectifying circuit 13 from an input terminal to the output terminal 308 may be longer than a conduction pattern from an edge of the pattern of the winding 122, the edge on the side opposite to the rectifying circuit 13, to the input terminal of the rectifying circuit 13. This allows heat generated in the transformer 12 to be efficiently released in the DC region. Thus, heat transmission from the output terminal 308 of the sub-substrate 30 to the main substrate 40 can be suppressed, so that heat can be prevented from being collected to the main substrate 40. However, in the sub-substrate 30, by making the conduction pattern where DC flows shorter than the conduction pattern where AC flows, the power transmission path may be shortened to suppress power loss.

The connector 35 outputs power supplied from the three sub-substrates 30 to the outside of the device 100 and has the above-described collecting portion 14 and output terminals 15. The collecting portion 14 collects DC output from each output terminal 308 of the plurality of sub-substrates 30. For example, the collecting portion 14 may be provided inside the connector 35, and the output terminal 308 of each of the three sub-substrates 30 and the collecting portion 14 may be connected with the electric wire 420. The collecting portion 14 may output the collected DC to the outside of the device 100 via the output terminals 15. Note that in FIG. 2A and FIG. 2B, illustration of the output terminals 15 is omitted.

On the main substrate 40, the three sub-substrates 30 may be mounted, and in the present embodiment, as an example, it is arranged in a direction perpendicular to the Z direction. The main substrate 40 may be a rectangular printed circuit board.

The main substrate 40 may have AC output terminals 401 in addition to the above-described inverter 11. Note that in FIG. 2A and FIG. 2B, illustration of the inverter 11 is omitted; however, the inverter 11 may be mounted on the main substrate 40, and in the present embodiment, as an example, it is provided on the mounting surface of the sub-substrate 30.

The AC output terminals 401 output AC power supplied from the inverter 11. The two windings 121 may be connected in parallel to the AC output terminals 401. For example, the AC output terminals 401 and the windings 121 may be connected with electric wires 410.

According to the foregoing device 100, the windings 122 are formed in patterns on the sub-substrates 30, and therefore, the windings 122 can be connected to the circuits of the sub-substrates 30 without connected portions made by soldering or the like. Thus, heat generation due to contact resistance can be prevented while heat generated in the windings 122 can be transferred to the circuits of the sub-substrates 30 to be released. Also, the windings 122 are formed in patterns, and therefore the windings 122 can be thinner than in a case where a copper sheet is used. Thus, even if a high frequency electric current is passed, heat generation due to skin effect can be prevented.

Also, because the device 100 includes the plurality of sub-substrates 30 where the patterns of the windings 122 and the rectifying circuits 13 are formed, the amount of electric current flowing through each rectifying circuit 13 can be decreased. Thus, power loss and heat generation in the rectifying circuits 13 can be suppressed.

Also, each winding 121 is arranged between the sub-substrates 30 on which the patterns of the windings 122 are formed. Therefore, the windings 121 and 122 are alternately stacked. Thus, magnetic coupling between the windings 121 and 122 can be improved to reduce leakage inductance in the transformer 12 and to enhance power conversion efficiency.

Also, the core 120 has the yoke portions 1202 in addition to the core body 1201, and therefore, leakage flux and also leakage inductance in the transformer 12 can be reduced to enhance power conversion efficiency.

Also, since the inverter 11 includes the wide gap semiconductor, the core 120 and the inductor 132 can be downsized and lightened, and therefore a structure for supporting the sub-substrate 30 can be simplified.

Figure 3:
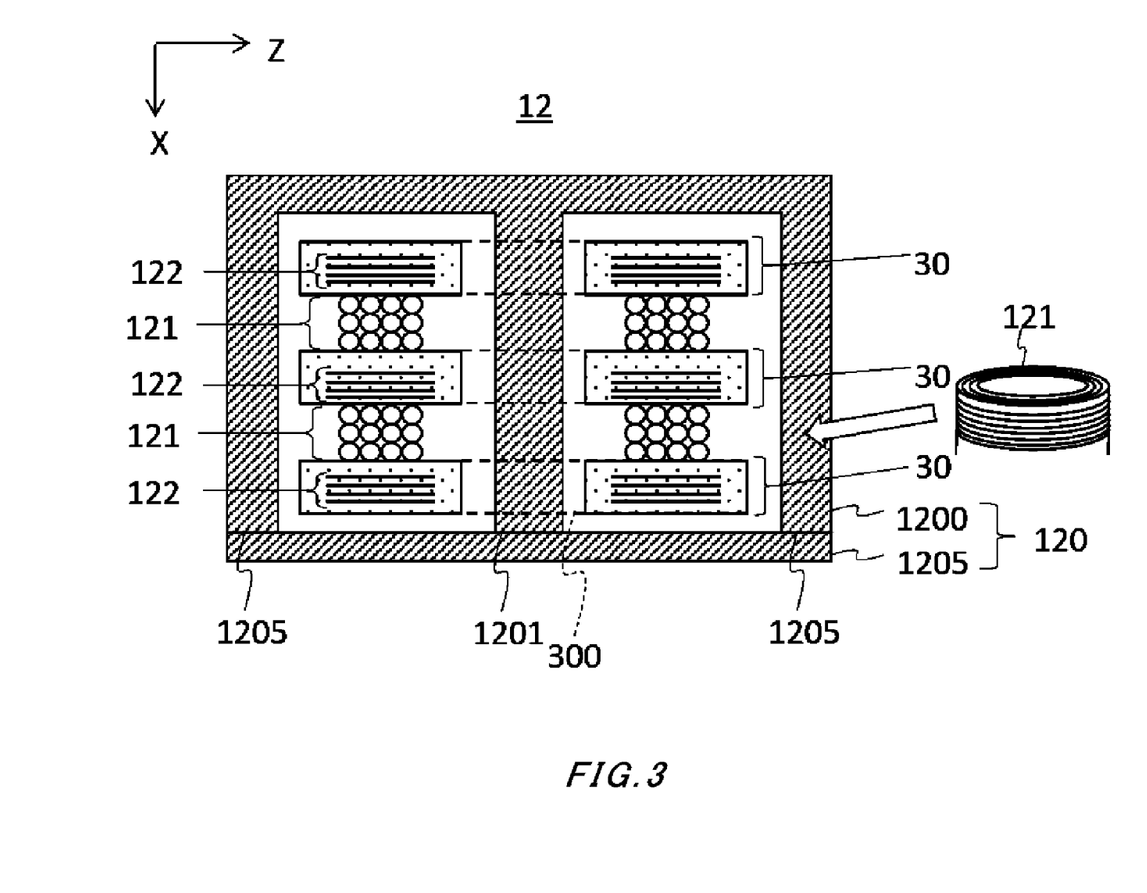
FIG. 3 shows a cross section of a transformer.

FIG. 3 shows a cross section of the transformer 12. The pattern of the winding 122 may be formed by alternately stacking a circular or polygonal conduction pattern and an insulating layer. For example, the pattern of the winding 122 may be formed by stacking a plurality of conduction patterns. As an example, in at least one of the plurality of sub-substrates 30, the pattern of the winding 122 may turn partially around the through hole 300 on each of a plurality of substrate layers so as to turn around the through hole 300 by beyond one circle as a total on the plurality of substrate layers. The patterns of the winding 122 may be electrically connected between the plurality of substrate layers with a conductive via. By stacking the plurality of conduction patterns to form the windings 122 in this manner, the conduction patterns with a high thermal conductivity increase. By the amount of such increase, the efficiency in releasing heat in the sub-substrate 30 is improved. Note that the layer number of sub-substrates 30 may be increased only in a region for forming the windings 122. In this case, the cost of manufacturing the sub-substrates 30 can be reduced.

Also, each sub-substrate 30 contacting the winding 121 may have the pattern of the winding 122 only in an inner layer on the surface side contacting the winding 121. For example, the sub-substrate 30 may have an insulating layer outside the pattern of the winding 122. In this way, by arranging the sub-substrate 30 and the winding 121 to simply abut each other, the winding 121 and the winding 122 are insulated, which eliminates efforts to insulate them. Also, material with a low insulation voltage can be used as the material for the winding 121. Note that as long as the insulating layer is provided around and on the outer side of the conduction pattern of the winding 122, the conduction pattern of the winding 122 may be exposed to the outside. Also in this case, the insulating layer provided on the outer side functions as a spacer, so that the windings 121 and 122 can be insulated from each other.

In addition to or instead of this, the winding 121 may be formed by winding an insulated wire. Here, for example, the insulated wire may be an electric wire formed of a conductor covered with an insulator such as a three-layer insulated wire. Also in this case, by arranging the sub-substrate 30 and the winding 121 to simply abut each other, the winding 121 and the winding 122 are insulated, which eliminates efforts to insulate them.

Figure 4:
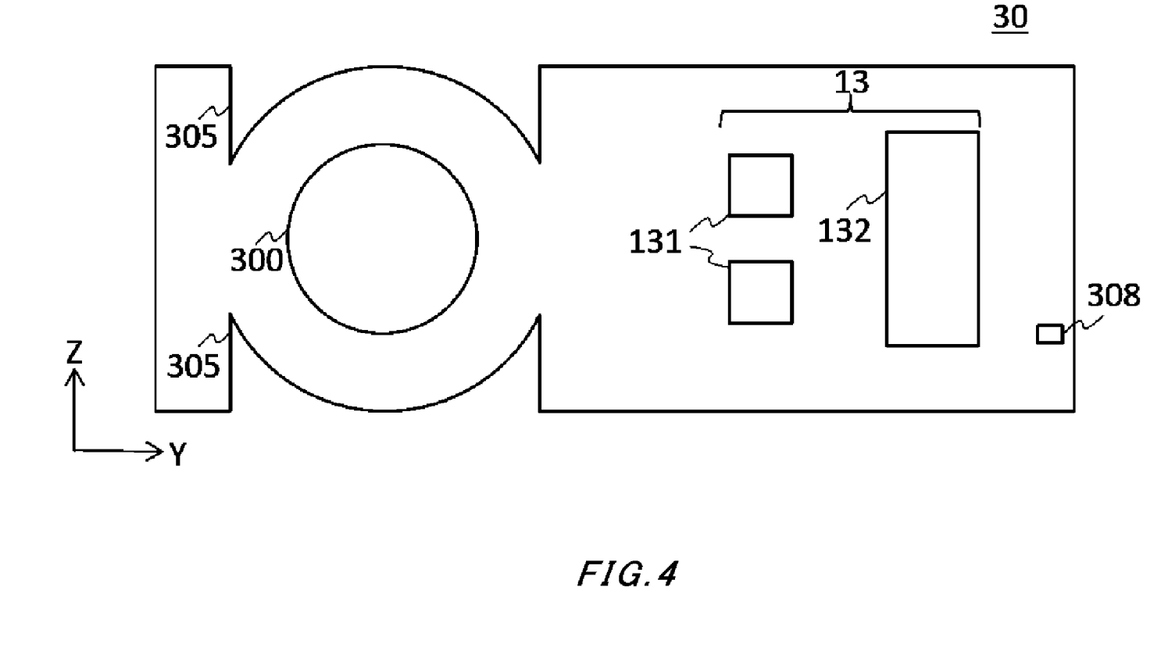
FIG. 4 shows a sub-substrate.

FIG. 4 shows the sub-substrate 30. In the present embodiment, as an example, the sub-substrate 30 has the notches 305 above and below the through hole 300 into which the core body 1201 is inserted. Through the notches 305, the yoke portions 1202 are inserted. The through hole 300 may be circular. The notches 305 may be formed separate vertically from each other only by the radial width dimension of the winding 122 from the through hole 300 in order to form a annular pattern of the winding 122 around the through hole 300. The notches 305 may be formed with the width approximately the same as the diameter of the winding 122 in the Y direction.

Figure 5A:
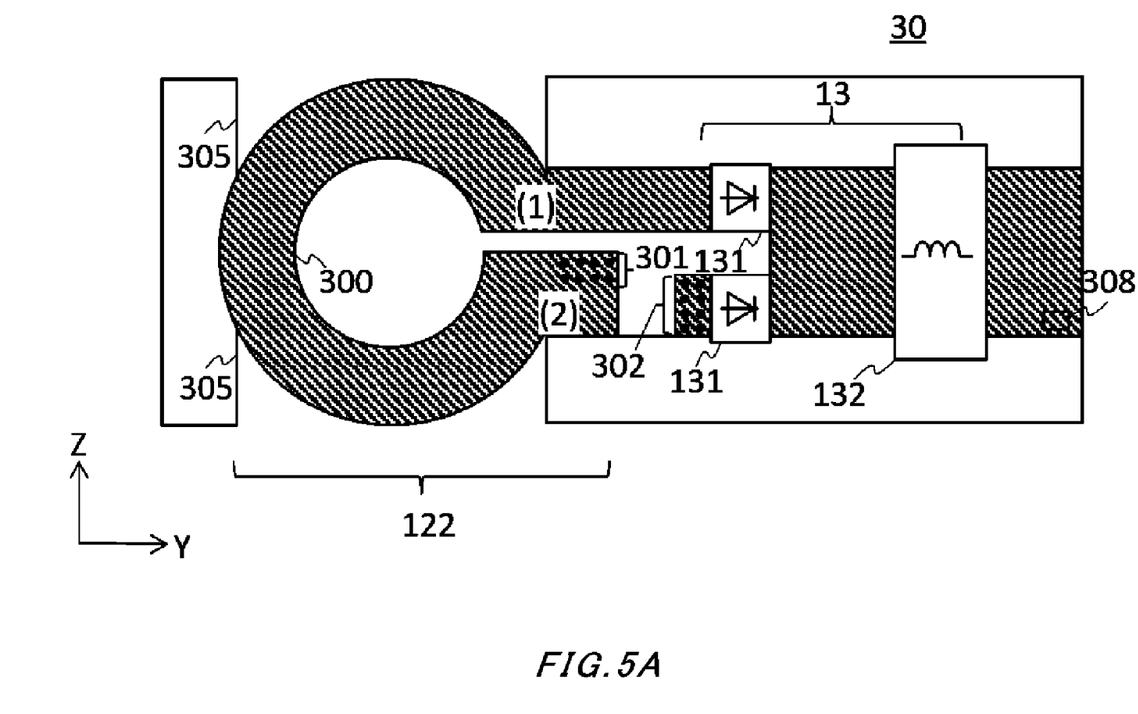
FIG. 5A shows an exemplary conduction pattern formed on a front surface of the sub-substrate.
Figure 5B:
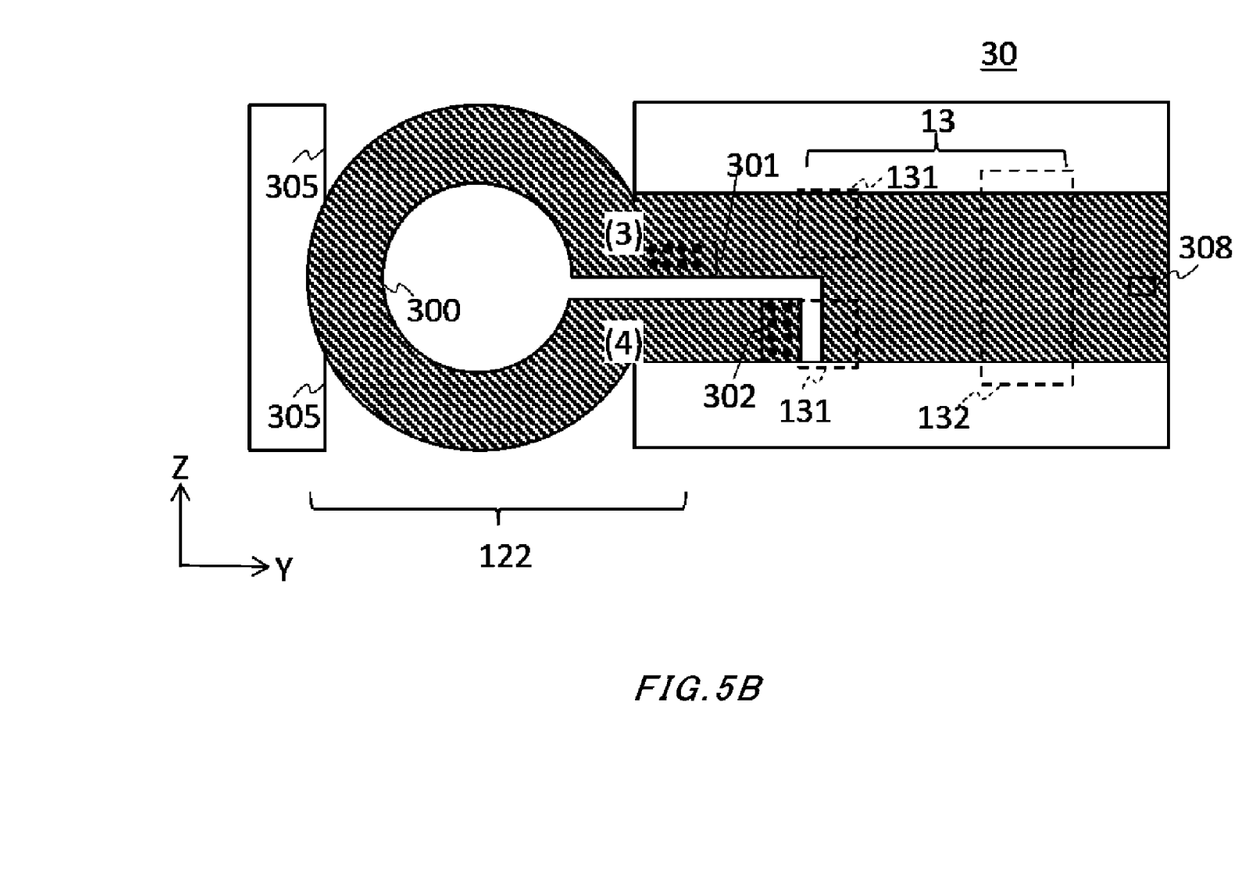
FIG. 5B shows an exemplary conduction pattern formed on a back surface of the sub-substrate.

FIG. 5A and FIG. 5B show exemplary conduction patterns formed on a front surface and a back surface of the sub-substrate 30, respectively. On at least one of the three sub-substrates 30, the pattern of the winding 122 may be formed on both surfaces of the sub-substrate 30. This allows the number of turns of the winding 122 to be easily increased.

In the case where the pattern of the winding 122 is formed on the both surfaces of the sub-substrate 30, the patterns of the windings 122 on the both surfaces may be electrically connected with two conductive vias 301 and 302 that penetrate the sub-substrate 30. Note that in this drawing, the pattern on each surface is a pattern that is wound approximately once within a layer; however, it may be a pattern that is wound more than twice. From the viewpoint of enhancing efficiency in releasing heat in the sub-substrate 30, a line width of at least part of the conduction pattern on the sub-substrate 30 is preferably thick. For example, the conduction pattern on the output side of the rectifying circuit 13 may be thicker than the conduction pattern of the winding 122.

Note that in the conduction patterns shown in FIG. 5A and FIG. 5B, the winding 122 is wound to sequentially pass through points (1) to (4). That is, the pattern of the winding 122 extends from the side of the upper rectifying element 131, passes through the pattern of the winding 122, and reaches the conductive via 301 on the front surface of the sub-substrate 30 (from the point (1) to the point (2)). Then, on the back surface, the pattern extends from the conductive via 301, passes through the pattern of the winding 122, and reaches the conductive via 302 (from the point (3) to the point (4)). The conduction paths in the Y direction passing through the points (1) and (4) serve as wiring paths on the both ends of the center-tapped full wave rectifying circuit and are connected to the output terminals 308 through the rectifying elements 131, respectively. Also, the conduction path in the Y direction passing through the point (3) serves as a wiring path on the center tap side and is connected to the output terminal 308.

Figure 6A:
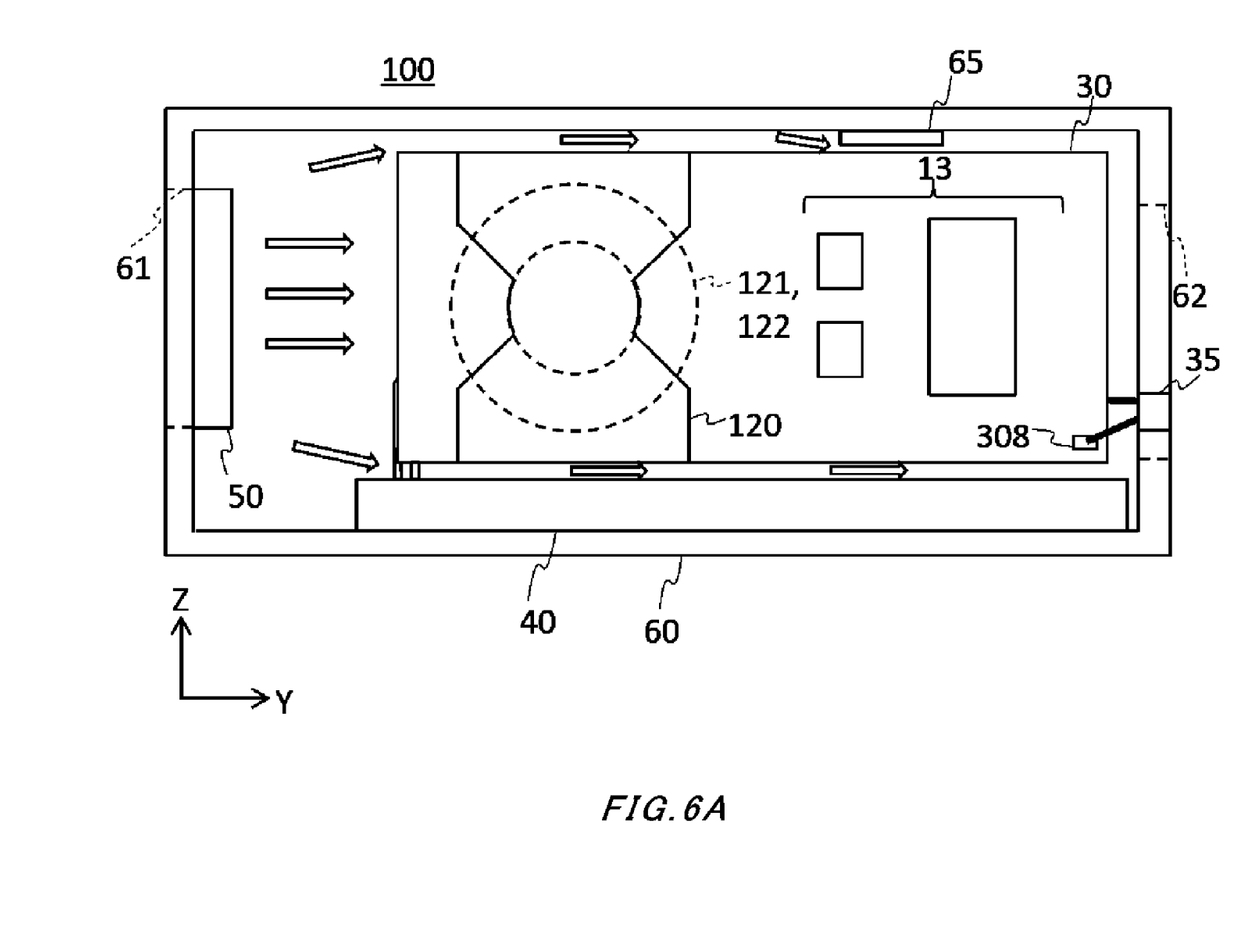
FIG. 6A shows a structure of a device according to a modification.
Figure 6B:
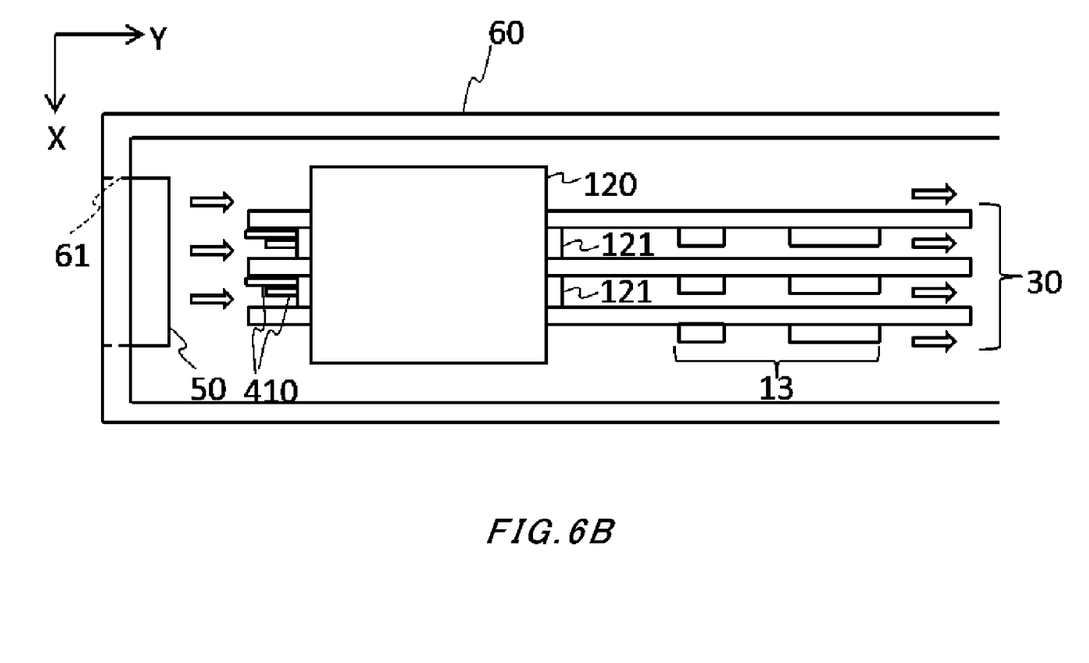
FIG. 6B shows a structure of the device according to the modification.

FIG. 6A and FIG. 6B each show a structure of the device 100 according to a modification. The device 100 according to the present modification includes a cooling unit 50 and a housing 60 in addition to the above-described core 120, two windings 121, three sub-substrates 30, connector 35 and main substrate 40.

The cooling unit 50 passes cooling air between the three sub-substrates 30. For example the cooling unit 50 may be a cooling fan. The cooling unit 50 may be installed on an inner surface of the housing 60 to face the side of the plurality of sub-substrates 30. In the present embodiment, as an example, the cooling unit 50 is fixed to a side surface out of the inner surfaces of the housing 60, the side surface facing the narrow side of the sub-substrate 30 on the winding 122 side. In order to take in cooling air from the outside, a slit 61 communicating with the outside may be provided in a wall portion of the housing 60, the wall portion on which the cooling unit 50 is installed. Also, in the wall portion facing this wall portion, a slit 62 may be provided for discharging the cooling air to the outside.

The housing 60 accommodates the core 120, the two windings 121, the three sub-substrates 30, the connector 35, the main substrate 40, and the cooling unit 50. In the present embodiment, as an example, the housing 60 accommodates these portions while supporting the main substrate 40 on the inside bottom thereof. Also, the housing 60 has the connector 35 in the state of being embedded in the wall portion. The output terminal 15 of the device 100 may be arranged on the outer surface of the connector 35. An air regulating portion 65 may be provided on an inner surface inside the housing 60, the surface facing the main substrate 40. The air regulating portion 65 directs cooling air flowing along the inner surface to flow between the sub-substrates 30 toward the main substrate 40. For example, the air regulating portion 65 may be a plate-shape member provided on the inner top surface of the housing 60. It may be arranged such that part thereof farther away from the cooling unit 50 is more distant from the inner top surface of the housing 60.

According to the device 100 of the present modification, cooling air is passed between the sub-substrates 30, and therefore each sub-substrate 30 can be cooled efficiently.

Note that in the above described modification, the housing 60 accommodates each portion of the device 100, but it may not accommodate the cooling unit 50. For example, the cooling unit 50 may be installed outside the wall portion of the housing 60, the wall portion provided with the slit 61. In addition to or instead of this, the housing 60 may accommodate at least one additional load that receives power supplied from the output terminal 15.

Also, in the above description, the cooling unit 50 passes cooling air between the sub-substrates 30 from the narrow side on the winding 122 side, that is, from one narrow side to the other narrow side. However, cooling air may be passed from one longer side to the other longer side of each sub-substrate 30, with the sub-substrate 30 installed to stand on the main substrate 40 such that the narrow side of the sub-substrate 30 on the winding 122 side is on the bottom.

Also, in the above described embodiment, the secondary winding 122 is formed of a conduction pattern. However, the primary winding 121 may be formed of a conduction pattern, or both windings 121 and 122 may be formed of a conduction pattern.

Also, in the above description, the rectifying circuit 13 is a center-tapped full wave rectifying circuit, but it may be another type of rectifying circuit. For example, the rectifying circuit 13 may be a full-bridge rectifying circuit or a current-doubler rectifying circuit.

Also, in the above description, the collecting portion 14 is provided inside the connector 35, but it may be provided on the main substrate 40. In this case, the output terminal 308 of the sub-substrate 30 may be connected to the collecting portion 14 of the main substrate 40 through the electric wires 420. Also, the output terminal 15 that outputs the collected DC may be provided on the main substrate 40. Instead, the device 100 may not include the collecting portion 14. In this case, DC from each rectifying circuit 13 of the sub-substrates 30 may be output directly to an external connector of the device 100 or the like to be collected. This allows the power transmission path to be shorter than in a case where electric current is collected at the collecting portion 14 inside the device 100 to be output to the outside of the device 100. Thus, the power loss can be suppressed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As apparent from the above description, according to one embodiment of the present invention, heat can be prevented from being generated in the connected portion.

What is claimed is:
1. A device comprising:
a core;
a first winding portion that turns around an outer circumference of the core;
a plurality of sub-substrates each having a pattern of a second winding turning around the outer circumference of the core; and
a main substrate on which the plurality of sub-substrates are mounted,
wherein
the plurality of sub-substrates are mounted on the main substrate to be in parallel to each other,
each of the plurality of sub-substrates has a through hole into which a magnetic core portion of the core is inserted,
the pattern of the second winding turns around the through hole on each of the plurality of sub-substrates,
a plurality of the first winding portions each of which is arranged between different sub-substrates out of the plurality of sub-substrates, and the sub-substrate out of the plurality of sub-substrates that contacts the first winding portion has the pattern of the second winding only in an inner layer on a surface side contacting the first winding portion.

2. The device according to claim 1, wherein in at least one of the plurality of sub-substrates, the pattern of the second winding turns partially around the through hole on each of a plurality of substrate layers so as to turn around the through hole by beyond one circle as a total on the plurality of substrate layers.

3. The device according to claim 2, wherein the patterns of the second winding are electrically connected between the plurality of substrate layers with a conductive via.

4. The device according to claim 1, wherein on at least one of the plurality of sub-substrates, the pattern of the second winding is formed on both surfaces of the sub-substrate.

5. The device according to claim 1, wherein each of the plurality of sub-substrates has a notch on at least one side thereof, the notch through which a yoke portion is inserted to be placed on a side of an outer circumference of the winding of the core.

6. The device according to claim 1, wherein the first winding portion is formed by winding an insulated wire.

7. The device according to claim 1, further comprising a cooling unit that passes cooling air between the plurality of sub-substrates.

8. The device according to claim 7, further comprising an air regulating portion provided on an inner surface inside a housing of the device, the surface facing the main substrate, the air regulating portion directing cooling air flowing along the inner surface to flow between sub-substrates out of the plurality of sub-substrates toward the main substrate.

9. The device according to claim 1, wherein each of the plurality of sub-substrates has a rectifying element that rectifies AC from the second winding mounted on the sub-substrate.

10. The device according to claim 9, wherein the main substrate has a collecting portion that collects DC output from each of the plurality of sub-substrates.

11. The device according to claim 10, wherein each of the plurality of sub-substrates and the collecting portion are connected with an electric wire.

12. The device according to claim 9, wherein each of the plurality of sub-substrates further has an inductor connected between the rectifying element and an output terminal.

13. The device according to claim 9, wherein
each of the plurality of sub-substrates has an output terminal that outputs DC that has been rectified by the rectifying circuit, and
a conductive path from the rectifying element to the output terminal is longer than a conductive path from the rectifying element to an edge of the pattern of the second winding, the edge being on a side opposite to the rectifying circuit.

14. The device according to claim 1, wherein the main substrate has an inverter that is mounted on the main substrate and converts input current into AC and supplies the AC to the first winding portion.

15. The device according to claim 14, wherein the inverter includes a wide gap semiconductor mounted on the main substrate and configured to convert input current into AC and supplies the AC within a range of 100 kHz through 1 MHz to the first winding portion.

* * * * *